United States Patent
Marupaduga et al.

(10) Patent No.: US 10,439,686 B1
(45) Date of Patent: Oct. 8, 2019

(54) WIRELESS BASE STATION TO CONTROL AN INTEGRATED LONG TERM EVOLUTION AND NEW RADIO (LTE/NR) ANTENNA ARRAY

(71) Applicant: Sprint Communications Company L.P., Overland Park, KS (US)

(72) Inventors: Sreekar Marupaduga, Overland Park, KS (US); Rajveen Narendran, Olathe, KS (US)

(73) Assignee: Sprint Communication Company L.P., Overland Park, KS (US)

( * ) Notice: Subject to any disclaimer, the term of this patent is extended or adjusted under 35 U.S.C. 154(b) by 0 days.

(21) Appl. No.: 16/109,121

(22) Filed: Aug. 22, 2018

(51) Int. Cl.
| | |
|---|---|
| *H04B 7/0426* | (2017.01) |
| *H04W 76/16* | (2018.01) |
| *H04B 7/0452* | (2017.01) |
| *H04B 7/08* | (2006.01) |
| *H04W 72/04* | (2009.01) |
| *H04W 88/08* | (2009.01) |

(52) U.S. Cl.
CPC ......... *H04B 7/0426* (2013.01); *H04B 7/0452* (2013.01); *H04B 7/088* (2013.01); *H04B 7/0814* (2013.01); *H04W 72/0473* (2013.01); *H04W 76/16* (2018.02); *H04W 88/085* (2013.01)

(58) Field of Classification Search
CPC .... H04B 7/0426; H04B 7/088; H04B 7/0814; H04B 7/0452; H04W 72/0473; H04W 76/16; H04W 88/085

USPC .......................................................... 375/262
See application file for complete search history.

(56) References Cited

U.S. PATENT DOCUMENTS

| | | | |
|---|---|---|---|
| 6,400,335 B1 | 6/2002 | Weaver et al. | |
| 7,260,366 B2 | 8/2007 | Lee et al. | |
| 7,400,907 B2 | 7/2008 | Jin et al. | |
| 9,350,411 B2 | 5/2016 | Lea et al. | |
| 9,420,395 B1 | 8/2016 | Khlat | |
| 9,525,204 B2 | 12/2016 | O'Keeffe et al. | |
| 2003/0161410 A1 | 8/2003 | Smith et al. | |
| 2009/0322621 A1 | 12/2009 | Inanoglu et al. | |
| 2011/0018780 A1 | 1/2011 | Tassoudji et al. | |
| 2018/0332541 A1* | 11/2018 | Liu | H04W 52/146 |
| 2018/0376429 A1* | 12/2018 | Islam | H04W 74/0833 |
| 2019/0104480 A1* | 4/2019 | Hasholzner | H04W 52/228 |

* cited by examiner

Primary Examiner — Juan A Torres

(57) ABSTRACT

An antenna array in a wireless base station has a New Radio (NR) portion and a Long Term Evolution (LTE) portion. Baseband circuitry determines NR User Equipment (UE) loading and LTE UE loading on the antenna array. The baseband circuitry determines an NR power level and an LTE power level based on the NR UE loading and the LTE UE loading. Radio circuitry drives the NR portion of the antenna array at the NR power level and drives the LTE portion of the antenna array at the LTE power level. The baseband circuitry may also re-allocate antenna elements between the NR elements and the LTE elements in the antenna array based on antenna element loss, UE loading, and control channel usage. The baseband circuitry may also separately implement Multi-User Multiple Input Multiple Output (MU-MIMO) on the NR and LTE portions of the antenna array.

20 Claims, 5 Drawing Sheets

US 10,439,686 B1

WIRELESS BASE STATION TO CONTROL AN INTEGRATED LONG TERM EVOLUTION AND NEW RADIO (LTE/NR) ANTENNA ARRAY

TECHNICAL BACKGROUND

Wireless data networks serve wireless User Equipment (UEs) with mobile data communication services like internet access, voice calling, and machine communications. The wireless UEs could be computers, phones, headsets, graphic displays, vehicles, drones, or some other wireless communication apparatus. The wireless data networks have wireless base stations that wirelessly exchange user data and signaling over the air with these wireless UEs. The wireless UEs and base station use wireless networking protocols like New Radio (NR) and Long Term Evolution (LTE) to communicate over the air.

The typical wireless base station has an antenna array, radio, and baseband unit. The baseband unit exchanges user data between a data communication network and the radio. The radio digitizes, modulates, amplifies, and filters the user data for the antenna array. The antenna array features antenna elements that are typically metallic center-tapped dipoles. The antenna array wirelessly exchanges user data with the UEs. Based on received signal strength at the wireless base station, the base station directs the UEs to use various power levels for their wireless signal transmissions to the base station. Based on received signal strength at the UEs, the wireless base station also selects its own power levels for transmissions to the UEs. The wireless base station has a maximum transmit power for all UEs. For example, a wireless base station may have a maximum transmit power of 40 watts for all UEs in a given sector.

Beamforming technology uses multiple antennas at the transmitter to emit wireless signal beams directed at specific UEs. Beamforming technology also uses multiple antennas at the receiver to separate different wireless signals from different antennas. Multiple Input Multiple Output (MIMO) technology controls how user data is wirelessly transferred over the multiple antennas. Using MIMO, the same data may be transferred in parallel over several antennas for reliability, or different data may be transferred in parallel over several antennas for throughput. With Multi-User (MU) MIMO, the wireless base station and multiple UEs share the same time and frequency resource blocks by using beamforming.

Unfortunately, the antenna arrays that use both NR and LTE have not been optimized for power distribution across the NR and LTE antenna elements. Moreover, these LTE/NR antenna arrays have not been optimized for MU-MIMO. In addition, the LTE/NR antenna arrays have not been optimized to efficiently and effectively handle varying load conditions and antenna element configurations.

TECHNICAL OVERVIEW

An antenna array in a wireless base station has a New Radio (NR) portion and a Long Term Evolution (LTE) portion. Baseband circuitry determines NR User Equipment (UE) loading and LTE UE loading on the antenna array. The baseband circuitry determines an NR power level and an LTE power level based on the NR UE loading and the LTE UE loading. Radio circuitry drives the NR portion of the antenna array at the NR power level and drives the LTE portion of the antenna array at the LTE power level. The baseband circuitry may also re-allocate antenna elements between the NR elements and the LTE elements in the antenna array based on antenna element loss, UE loading, and control channel usage. The baseband circuitry may also separately implement Multi-User Multiple Input Multiple Output (MU-MIMO) on the NR and LTE portions of the antenna array.

DETAILED DESCRIPTION

Figure 1:
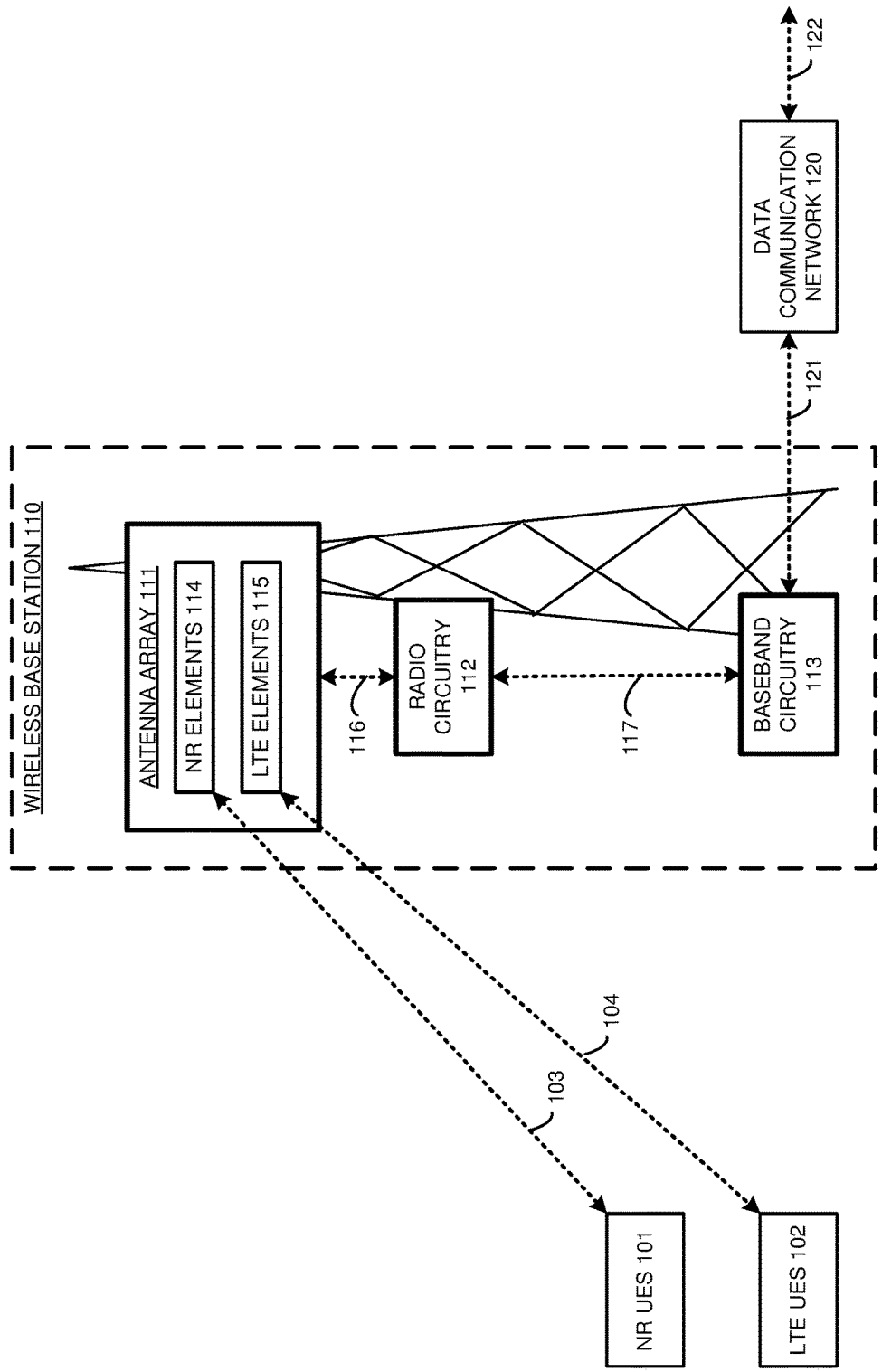
FIG. 1 illustrates a wireless base station that controls an integrated Long Term Evolution/New Radio (LTE/NR) antenna array.

FIG. 1 illustrates wireless base station 110 that controls integrated Long Term Evolution/New Radio (LTE/NR) antenna array 111. Wireless base station 110 serves User Equipment (UEs) 101-102 over wireless communication links 103-104. UEs 101 and wireless communication links 103 use New Radio (NR). UEs 102 and wireless communication links 104 use Long Term Evolution (LTE). Wireless base station 110 also exchanges user data and network signaling with data communication network 120 over data communication links 121. Data communication network 120 exchanges the user data with various systems like the internet over data communication links 122.

Wireless base station 110 comprises antenna array 111, radio circuitry 112, and baseband circuitry 113. Antenna array 111 comprises NR antenna elements 114 and LTE antenna elements 115. NR elements 114 and NR UEs 101 exchange NR user data and NR network signaling over NR communication links 103. LTE elements 115 and LTE UEs 102 exchange LTE user data and LE network signaling over LTE communication links 104. NR elements 114 and LTE elements 115 exchange the user data and the network signaling with radio circuitry 112 over data communication links 116. Data communication links 116 are typically metallic cabling that carry analog electromagnetic signals.

Radio circuitry 112 exchanges the user data and the network signaling with baseband circuitry 113 over data communication links 117. Data communication links 117 are typically metallic/optical cabling or wireless links. In some examples, data communication links 117 transport Common Public Radio Interface (CPRI) data between radio circuitry 112 and baseband circuitry 113.

Antenna array 111 and radio circuitry 112 are usually mounted at an elevation, although elevated mounting is not required. Baseband circuitry 113 is typically located on the ground near radio circuitry, but at least some of baseband circuitry 113 may be located remotely in data communication network 120. In some examples, wireless base station 110 is mobile.

Baseband circuitry 113 exchanges user data and network signaling with data communication network 120 over data communication links 121. Data communication network 120 comprises network elements like routers, gateways, servers, and controllers. Data communication links 121 are typically metallic/optical cabling or wireless links. In some examples, data communication links 121 transport internet protocol over ethernet to carry the user data and network signaling. Other data networking protocols and transmission media could be used.

NR UEs 101 and LTE UEs 102 could be computers, phones, headsets, graphic displays, vehicles, drones, or some other wireless communication apparatus. UEs 101-102 comprise antennas, modulators, amplifiers, filters, digital/analog interfaces, Digital Signal Processors (DSPs), memory circuitry, firmware/software, and bus circuitry. UEs 101-102 comprise Central Processing Unit (CPU) circuitry, memory circuitry, software, bus circuitry, and transceiver circuitry. The software includes an operating system and modules for Physical Layer (PHY), Media Access Control (MAC), Radio Link Control (RLC), Packet Data Convergence Protocol (PDCP), Radio Resource Control (RRC), Service Data Application Protocol (SDAP), and the like.

NR elements 114 and LTE elements 115 comprise metallic rods that are usually configured into center-tapped dipoles. In some examples, there are 64 center-tapped dipoles that are dynamically allocated between NR elements 114 and LTE elements 115 by baseband circuitry 113. Radio circuitry 112 comprises duplexers, amplifiers, filters, modulators, digital/analog interfaces, DSPs, memory, firmware/software, and bus circuitry. Baseband circuitry 113 comprises CPUs, memory, software, bus circuitry, and transceiver circuitry. The software includes an operating system and modules for PHY, MAC, RLC, PDCP, RRC, SDAP, and the like.

In operation, baseband circuitry 113 determines NR UE loading on NR elements 114. Baseband circuitry 113 determines LTE UE loading on LTE elements 103. The NR UE loading could be the number of RRC-connected NR UEs 101 and the number may be modified by historical NR UE loading data for antenna array 111 at the same day/time. The LTE UE loading could be the number of RRC-connected LTE UEs 102 as modified by historical LTE UE loading data for antenna array 111 at the same day/time.

Baseband circuitry 113 determines an NR power level for the NR elements 114 in antenna array 111 based on the NR UE loading and also the LTE UE loading. Likewise, baseband circuitry 113 determines an LTE power level for LTE elements 115 of antenna array 111 based on the LTE UE loading and also the NR UE loading. Typically, the higher UE loads get more antenna elements with NR getting power priority over LTE. For example, antenna elements 114-115 may share 40 watts of power where elements 114-115 always get 10 watts of power, but NR elements 114 get the priority share of the remaining 20 watts based on its NR load. When NR elements 114 are lightly loaded and/or when LTE elements 115 are heavily loaded, then LTE elements 115 may receive some additional power above the initial 10 watts.

Baseband circuitry 113 hosts a data structure that correlates NR UE loading with LTE UE loading and then correlates this NR/LTE UE loading with NR power levels and LTE power levels. Note that the sum of the NR power level and the LTE power level should remain below the common and shared power threshold. Baseband circuitry 113 directs radio circuitry 112 to drive NR elements 114 in antenna array 111 at the selected NR power level. Baseband circuitry 113 directs radio circuitry 112 to drive LTE elements 115 in antenna array 111 at the selected LTE power level. CPRI may be used to facilitate this power control over antenna array 111 by baseband circuitry 116 through radio circuitry 112.

Radio circuitry 112 drives NR elements 114 in antenna array 111 at the selected NR power level. Radio circuitry 112 drives LTE elements 115 of antenna array 111 at the selected LTE power level. NR elements 114 in antenna array 111 wirelessly exchange NR signals with NR UEs 101 at the selected NR power level. LTE elements 115 in antenna array 111 wirelessly exchange LTE signals with LTE UEs 102 at the selected LTE power level.

In some examples, baseband circuitry 113 determines NR Multi-User Multiple Input Multiple Output (MU-MIMO) gain and signal strength for NR UEs 101. The MU-MIMO gain characterizes the operation of NR communication link 103 when using MU-MIMO. Baseband circuitry 113 selects an NR beamforming signal threshold for NR UEs 101 based on the NR MU-MIMO gain. Typically, a high NR MU-MIMO gain causes a low NR beamforming signal threshold to allow more NR UEs 101 to use beamforming and MU-MIMO. Baseband circuitry 113 hosts a data structure that correlates NR MU-MIMO gain levels with beamforming signal thresholds. Baseband circuitry 113 then selects some of NR UEs 101 for NR MU-MIMO based on the correct NR beamforming signal threshold as compared to the individual UE signal strengths. Baseband circuitry 113 directs radio circuitry 112 to drive NR elements 114 in antenna array 111 to use NR MU-MIMO for the selected NR UEs 101. Baseband circuitry 113 directs radio circuitry 112 to drive NR elements 114 in antenna array 111 to use NR Single-User (SU) MIMO (or another protocol) for non-selected NR UEs 101. Radio circuitry 112 drives the NR elements 114 in antenna array 111 to use NR MU-MIMO for selected NR UEs 101. NR elements 114 in antenna array 111 wirelessly exchange NR MU-MIMO signals with the selected NR UEs 101.

In some examples, baseband circuitry 113 determines LTE MU-MIMO gain and signal strength for LTE UEs 102. The MU-MIMO gain characterizes the operation of LTE communication link 104 when using MU-MIMO. Baseband circuitry 113 selects an LTE beamforming signal threshold for LTE UEs 102 based on the LTE MU-MIMO gain. Typically, a high LTE MU-MIMO gain causes a low LTE beamforming signal threshold to allow more LTE UEs 102 to use beamforming and MU-MIMO. Baseband circuitry 113 hosts a data structure that correlates LTE MU-MIMO gain levels with beamforming signal thresholds. Baseband circuitry 113 then selects some of LTE UEs 102 for LTE MU-MIMO based on the correct LTE beamforming signal threshold as compared to the individual UE signal strengths. Baseband circuitry 113 directs radio circuitry 112 to drive LTE elements 115 in antenna array 111 to use LTE MU-MIMO for the selected LTE UEs 102. Baseband circuitry 113 directs radio circuitry 112 to drive LTE elements 115 in antenna array 111 to use LTE SU-MIMO (or another protocol) for non-selected LTE UEs 102. Radio circuitry 112 drives the LTE elements 115 in antenna array 111 to use LTE MU-MIMO for selected LTE UEs 102. LTE elements 115 in antenna array 111 wirelessly exchange LTE MU-MIMO signals with the selected LTE UEs 102.

In some examples, baseband circuitry 113 detects an NR antenna element loss from antenna array 111. For example, the power amplifiers for a set of NR elements 114 could fail. In response, baseband circuitry 113 responsively reduces the number of LTE elements 115 in antenna array 111 and reallocates these antenna elements to NR elements 114. Baseband circuitry 113 hosts a data structure that correlates NR element loss numbers with LTE-to-NR element reallocations. Baseband circuitry 113 directs radio circuitry 112 to drive augmented NR elements 114 and reduced LTE elements 115 in antenna array 111, and radio circuitry 112 drives augmented NR elements 114 and reduced LTE elements 115 in antenna array 111. Augmented NR elements 114 and reduced LTE elements 115 in antenna array 111 wirelessly exchange additional NR signals and LTE signals with UEs 101-102 over wireless communication links 103-104.

In other examples, baseband circuitry 113 detects an LTE antenna element loss from antenna array 111. For example, the power amplifiers for a set of LTE elements 115 could fail. In response, baseband circuitry 113 responsively reduces the number of NR elements 114 in antenna array 111 and reallocates these antenna elements to LTE elements 115. Baseband circuitry 113 directs radio circuitry 112 to drive reduced NR elements 114 and augmented LTE elements 115 in antenna array 111. Baseband circuitry 113 hosts a data structure that correlates LTE element loss numbers with NR-to-LTE element reallocations. Radio circuitry 112 drives reduced NR elements 114 and augmented LTE elements 115 in antenna array 111. Reduced NR elements 114 and augmented LTE elements 115 in antenna array 111 wirelessly exchange additional NR signals and LTE signals with UEs 101-102 over wireless communication links 103-104.

In some examples, baseband circuitry 113 compares the LTE UE loading to LTE loading thresholds. In response, baseband circuitry 113 reduces the amount of LTE elements 115 in antenna array 111 as the LTE UE loading falls under individual LTE loading thresholds. Baseband circuitry 113 may reallocate these antenna elements to NR elements 114 as needed. Baseband circuitry 113 directs radio circuitry 112 to drive reduced LTE elements 115 in antenna array 111 for LTE UEs 102. Radio circuitry 112 drives reduced LTE elements 115 in antenna array 111 for LTE UEs 102. Reduced LTE elements 115 in antenna array 111 wirelessly exchange LTE signals with LTE UEs 102 over wireless LTE links 104. Likewise, baseband circuitry 113 increases the amount of LTE elements 115 in antenna array 111 as the LTE UE loading rises back above the individual LTE loading thresholds. Baseband circuitry 113 may reallocate antenna elements from NR elements 114 to LTE elements 115 as needed. Baseband circuitry 113 directs radio circuitry 112 to drive increased LTE elements 115 in antenna array 111 for LTE UEs 102. Radio circuitry 112 drives antenna array 111 to use increased LTE elements 115 in antenna array for LTE UEs 102. Increased LTE elements 115 in antenna array 111 wirelessly exchange LTE signals with LTE UEs 102 over wireless LTE links 104. Baseband circuitry 113 hosts a data structure that correlates LTE UE loading and NR UE loading to LTE antenna element numbers and configurations.

In some examples, baseband circuitry 113 compares the NR UE loading to NR loading thresholds. In response, baseband circuitry 113 reduces the amount of NR elements 114 in antenna array 111 as the NR UE loading falls under individual NR loading thresholds. Baseband circuitry 113 may reallocate these antenna elements to LTE elements 115 as needed. Baseband circuitry 113 directs radio circuitry 112 to drive reduced NR elements 114 in antenna array 111 for NR UEs 101. Radio circuitry 112 drives reduced NR elements 114 in antenna array 111 for NR UEs 101. Reduced NR elements 114 in antenna array 111 wirelessly exchange NR signals with NR UEs 101 over wireless NR links 103. Likewise, baseband circuitry 113 increases the amount of NR elements 114 in antenna array 111 as the NR UE loading rises back above the individual NR loading thresholds. Baseband circuitry 113 may reallocate antenna elements from LTE elements 115 to NR elements 114 as needed. Baseband circuitry 113 directs radio circuitry 112 to drive increased NR elements 114 in antenna array 111 for NR UEs 101. Radio circuitry 112 drives antenna array 111 to use increased NR elements 114 in antenna array for NR UEs 101. Increased NR elements 114 in antenna array 111 wirelessly exchange NR signals with NR UEs 101 over wireless NR links 103. Baseband circuitry 113 hosts a data structure that correlates NR UE loading and LTE UE loading to NR antenna element numbers and configurations.

In some examples, baseband circuitry 113 determines LTE control channel usage. The control channel usage may be the percent occupancy of the control channel resource blocks on the uplink and/or the downlink. Baseband circuitry 113 compares the LTE control channel usage to LTE control channel loading thresholds. Baseband circuitry 113 reduces the amount of LTE elements 115 in antenna array 111 as the LTE control channel usage falls under the LTE control channel loading thresholds. Baseband circuitry 113 may reallocate these antenna elements to NR elements 114 as needed. Baseband circuitry 113 directs radio circuitry 112 to drive reduced LTE elements 115 in antenna array 111 for LTE UEs 102. Radio circuitry 112 drives reduced LTE elements 115 in antenna array 111 for LTE UEs 102. Reduced LTE elements 115 in antenna array 111 wirelessly exchange LTE signals with LTE UEs 102 over wireless LTE links 104. Baseband circuitry 113 increases the amount of LTE elements 115 in antenna array 111 when the LTE control channel loading rises back above the LTE control channel loading thresholds. Baseband circuitry 113 may reallocate antenna elements from NR elements 114 to LTE elements 115 as needed. Baseband circuitry 113 directs radio circuitry 112 to drive increased LTE elements 115 in antenna array 111 for LTE UEs 102. Radio circuitry 112 drives antenna array 111 to use increased LTE elements 115 in antenna array for LTE UEs 102. Increased LTE elements 115 in antenna array 111 wirelessly exchange LTE signals with LTE UEs 102 over wireless LTE links 104. Baseband circuitry 113 hosts a data structure that correlates LTE control channel loading and NR control channel loading to LTE antenna element numbers and configurations.

In some examples, baseband circuitry 113 determines NR control channel usage. The control channel usage may be the percent occupancy of the control channel resource blocks on the uplink and/or the downlink. Baseband circuitry 113 compares the NR control channel usage to NR control channel loading thresholds. Baseband circuitry 113 reduces the amount of NR elements 114 in antenna array 111 as the NR control channel usage falls under the NR control channel loading thresholds. Baseband circuitry 113 may reallocate these antenna elements to LTE elements 115 as needed. Baseband circuitry 113 directs radio circuitry 112 to drive reduced NR elements 114 in antenna array 111 for NR UEs 101. Radio circuitry 112 drives reduced NR elements 114 in antenna array 111 for NR UEs 101. Reduced NR elements 114 in antenna array 111 wirelessly exchange NR signals with NR UEs 101 over wireless NR links 103. Baseband circuitry 113 increases the amount of NR elements 114 in antenna array 111 when the NR control channel loading rises back above the NR control channel loading thresholds. Baseband circuitry 113 may reallocate antenna elements from LTE elements 115 to NR elements 114 as needed. Baseband circuitry 113 directs radio circuitry 112 to drive increased NR elements 114 in antenna array 111 for NR UEs 101. Radio circuitry 112 drives antenna array 111 to use increased NR elements 114 in antenna array 111 for LNR UEs 101. Increased NR elements 114 in antenna array 111 wirelessly exchange NR signals with NR UEs 101 over wireless NR links 103. Baseband circuitry 113 hosts a data structure that correlates NR control channel loading and LTE control channel loading to NR antenna element numbers and configurations.

Advantageously, wireless base station 110 intelligently distributes power across NR elements 114 and LTE elements 115 in antenna array 111. Wireless base station 110 aggressively uses MU-MIMO over NR elements 114 and LTE elements 115 when network conditions are suitable. Wireless base station 110 efficiently and effectively controls antenna array 111 under varying load conditions and antenna element configurations.

Figure 2:
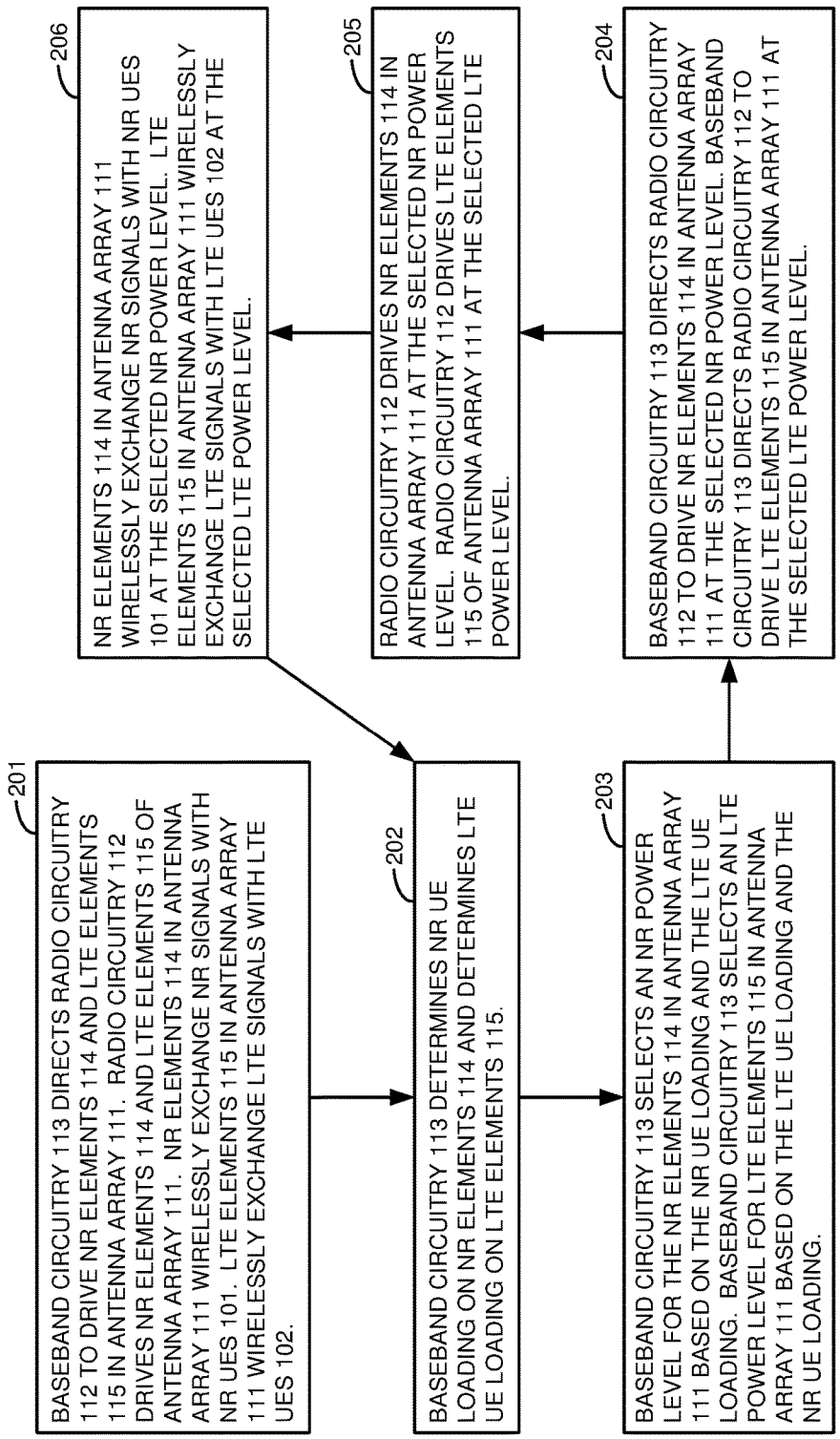
FIG. 2 illustrates the operation of the wireless base station to control the integrated LTE/NR antenna array.

FIG. 2 illustrates the operation of wireless base station 110 to control integrated LTE/NR antenna array 111. Baseband circuitry 113 directs radio circuitry 112 to drive NR elements 114 and LTE elements 115 in antenna array 111 (201). Radio circuitry 112 drives NR elements 114 and LTE elements 115 of antenna array 111. NR elements 114 in antenna array 111 wirelessly exchange NR signals with NR UEs 101. LTE elements 115 in antenna array 111 wirelessly exchange LTE signals with LTE UEs 102. Baseband circuitry 113 determines NR UE loading on NR elements 114 and determines LTE UE loading on LTE elements 115 (202). The UE loading may be the number of RRC-connected UEs as modified by historical UE loading data for antenna array 111 at the same day/time.

Baseband circuitry 113 selects an NR power level for the NR elements 114 in antenna array 111 based on the NR UE loading and the LTE UE loading (203). Baseband circuitry 113 also selects an LTE power level for LTE elements 115 in antenna array 111 based on the LTE UE loading and the NR UE loading. Baseband circuitry 113 uses a data structure that correlates NR UE loading with LTE UE loading and then correlates the NR/LTE UE loading with NR power levels and with LTE power levels. The sum of the NR power level and the LTE power level remains below their shared power threshold. Baseband circuitry 113 directs radio circuitry 112 to drive NR elements 114 in antenna array 111 at the selected NR power level (204). Baseband circuitry 113 directs radio circuitry 112 to drive LTE elements 115 in antenna array 111 at the selected LTE power level.

Radio circuitry 112 drives NR elements 114 in antenna array 111 at the selected NR power level (205). Radio circuitry 112 drives LTE elements 115 of antenna array 111 at the selected LTE power level. NR elements 114 in antenna array 111 wirelessly exchange NR signals with NR UEs 101 at the selected NR power level (206). LTE elements 115 in antenna array 111 wirelessly exchange LTE signals with LTE UEs 102 at the selected LTE power level. The operation repeats (202).

Figure 3:
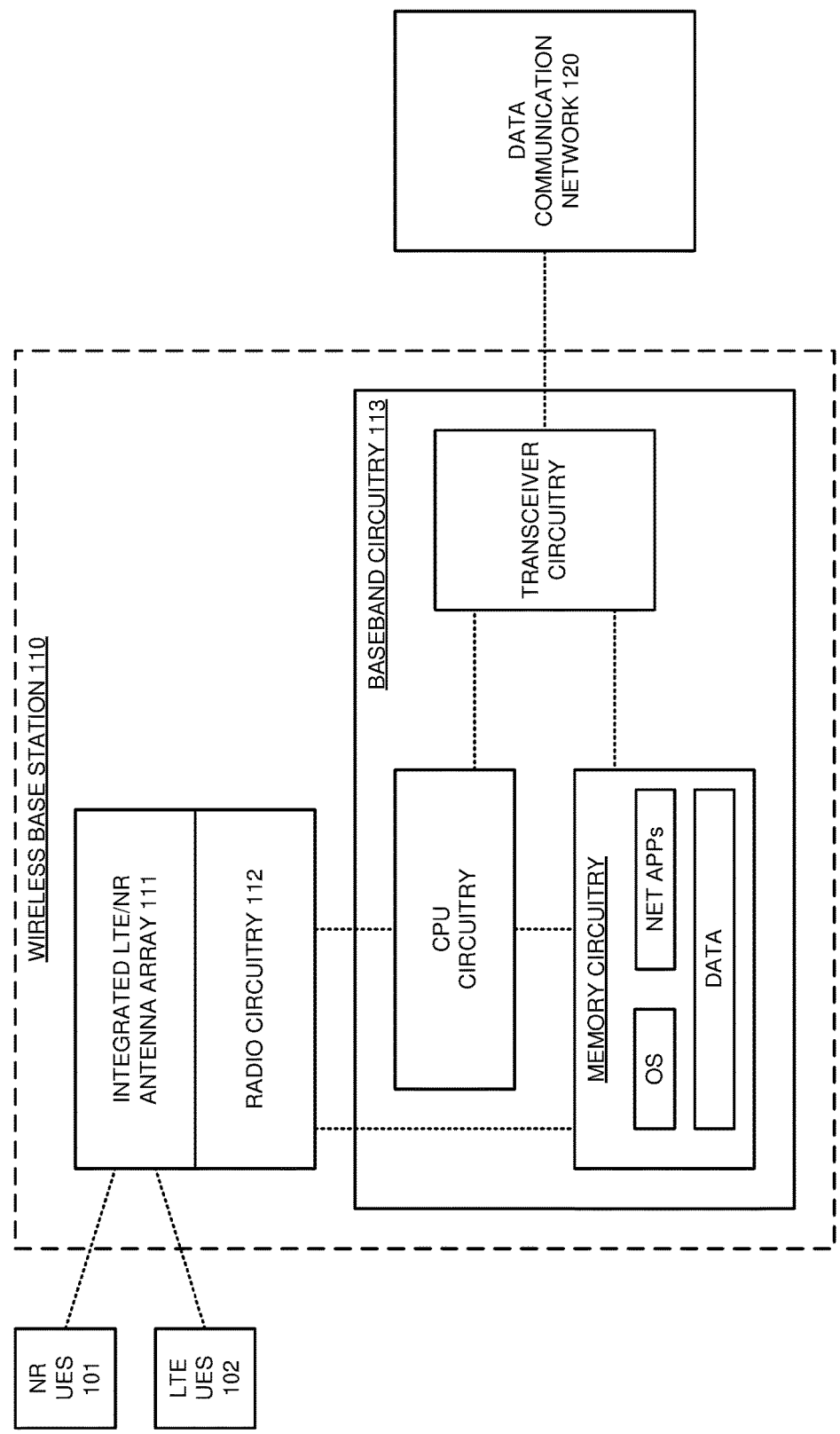
FIG. 3 illustrates a hardware architecture for the wireless base station to control the integrated LTE/NR antenna array.

FIG. 3 illustrates a hardware architecture for wireless base station 110 to control integrated LTE/NR antenna array 111. Wireless base station 110 comprises integrated LTE/NR antenna array 111, radio circuitry 112, and baseband circuitry 113. Baseband circuitry 113 comprises CPU circuitry, memory circuitry, transceiver circuitry, and bus circuitry. The memory circuitry stores an operating system (OS), net apps, and data.

Integrated LTE/NR antenna array 111 and radio circuitry 112 are coupled together over analog connections. Radio circuitry 112 is coupled to baseband circuitry 113 over CPRI or some other radio control protocol. The CPU circuitry, memory circuitry, and transceiver circuitry are coupled to one another over bus circuitry. The CPU circuitry executes the operating system and the net apps to control the exchange of the data over antenna array 111, radio circuitry 112, the memory circuitry, and the transceiver circuitry between UEs 101-102 and data communication network 120.

Figure 4:
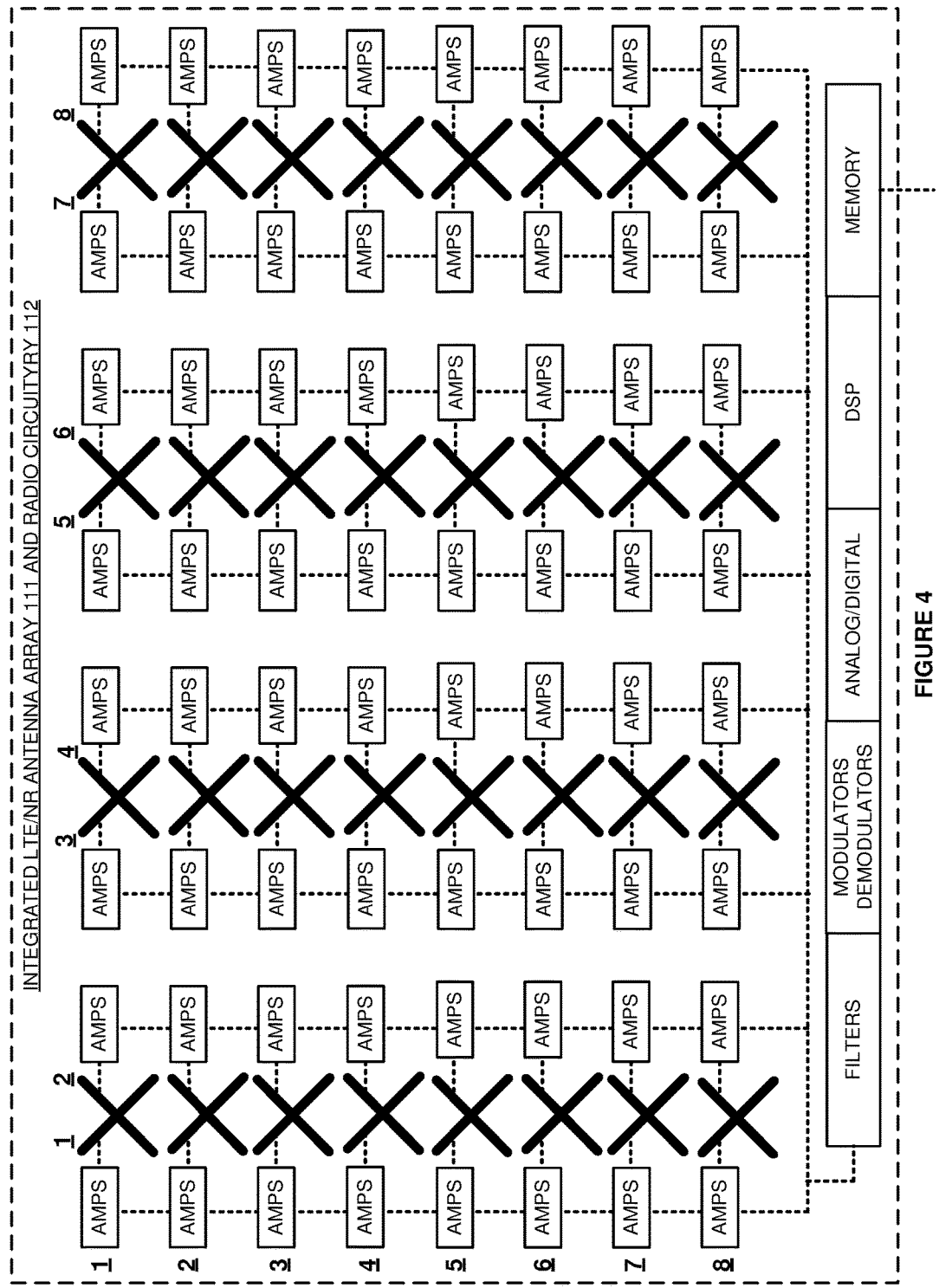
FIG. 4 illustrates the integrated LTE/NR antenna array and the radio circuitry for the wireless base station.

FIG. 4 illustrates integrated LTE/NR antenna array 111 and radio circuitry 112 for wireless base station 110. Integrated LTE/NR antenna array 111 comprises antenna elements that are depicted by the heavy X-shaped lines. Each line represents an individual antenna element like a center-tapped dipole. Although the X-shaped elements appear to touch, they represent two antenna elements that are separated from one another. There are eight columns and eight rows of antenna elements for a total of 64 antenna elements that can exchange wireless signals with UEs 101-102. NR elements 114 or LTE elements 115 may comprise any of these antenna elements in various antenna element configurations.

In some examples, NR elements 114 use the antenna elements in the first four columns elements (1,1) to (4, 8) and LTE elements 115 use the elements in the last four columns elements (5,1) to (8, 8). After an exemplary antenna element re-allocation, NR elements 114 may then use the antenna elements in the first six columns elements (1,1) to (6, 8) and LTE elements 115 may only use the antenna elements in the last two columns elements (7,1) to (8, 8). In another example, NR elements 114 comprise: (1,1)-(1,8), (4,1)-(4,8), (5,1)-(5,8), (8,1)-(8,8) and LTE elements 115 comprise: (2,1)-(2,8), (3,1)-(3,8), (6,1)-(6,8), (7,1)-(7,8). Elements (4,1)-(5,8) might be reallocated between NR elements 114 and LTE elements 115 as needed. In another example, NR elements 114 may comprise: (1,1)-(1,4), (2,1)-(2,4), (3,1)-(3,4), (4,1)-(4,4) and LTE elements 115 may comprise: (5,1)-(5,4), (6,1)-(6,4), (7,1)-(7,4), (8,1)-(8,4). Elements (1,5)-(1,8), (2,5)-(2,8), (3,5)-(3,8), (4,5)-(4,8) are reserved for NR elements 114. Elements (5,5)-(5,8), (6,5)-(6,8), (7,5)-(7,8), (8,5)-(8,8) are allocated to NR elements 114 or LTE elements 115 as needed. Other antenna element allocations and re-allocations could be used.

Radio circuitry 112 comprises duplexers, power amplifiers, low-noise amplifiers, filters, modulators/demodulators, analog/digital interfaces, DSP, and memory. Each antenna element is coupled through one of the duplexers to its own power amplifier for wireless signal transmission and to its own low-noise amplifier for wireless signal reception. The duplexers and amplifiers are denoted on FIG. 4 by the box that is labeled "AMPS." The AMPS are each coupled to transmit and receive filters that restrict analog signal energy to the relevant radio spectrum. The filters are coupled to modulators/demodulators for up/down conversion to the relevant radio spectrum. The modulators/demodulators are coupled to analog/digital interfaces. The analog/digital interfaces exchange analog signals with the modulators/demodulators and exchange corresponding digital signals with the DSP and/or the memory. The memory (and possibly the DSP) are coupled to baseband circuitry 113. The memory stores data and DSP firmware and/or software. The DSP executes the firmware/software and control instructions from baseband circuitry 113 to exchange the data between the memory and the analog/digital interfaces.

Referring to FIG. 3, the transceiver circuitry in baseband circuitry 113 receives and transfers DL data from data communication network 120 to the memory circuitry. The CPU circuitry executes the operating system and net apps to process the DL data. The net apps direct the CPU circuitry to transfer the DL data from its memory to radio circuitry 112 using a specific NR/LTE configuration and power level for antenna array 111.

Referring to FIG. 4, the DSP circuitry retrieves the DL data from its memory and transfers corresponding digital DL signals to the digital/analog interfaces. The digital/analog interfaces transfer analog DL signals to the modulators. The modulators up-convert the analog DL signals to their carrier frequencies. The amplifiers boost the modulated DL signals for the filters. The filters attenuate unwanted out-of-band energy from the boosted DL signals. The filters transfer the filtered DL signals through the duplexers to the NR and LTE antenna elements in antenna array 111. These electrical DL signals drive the NR and LTE antenna elements to emit corresponding wireless DL signals to UEs 101-102.

The antenna elements in antenna array 111 receive wireless UL signals from UEs 101-102 and transfer corresponding electrical UL signals through the duplexers to the low-noise amplifiers. The low-noise amplifiers boost the UL signals for the filters which attenuate unwanted energy. The modulators down-convert the UL signals from their carrier frequencies. The analog/digital interfaces convert between analog UL signals and digital UL signals. The DSP recovers UL data from the UL signals and transfers the recovered UL data to the memory and then to baseband circuitry 113.

Referring to FIG. 3, the CPU circuitry in baseband circuitry 113 executes the operating system and net apps to process the UL data in the memory circuitry. The net apps direct the CPU circuitry to transfer the UL data from the memory circuitry to the transceiver circuitry. The net apps direct the CPU circuitry to drive the transceiver circuitry to transfer the UL data to data communication network 120. The transceiver circuitry and data communication network 120 may wirelessly exchange the data.

In baseband circuitry 113, the CPU circuitry determines NR UE loading and LTE UE loading on antenna array 111. The CPU circuitry determines an NR power level for antenna array 111 based on the UE loading. Likewise, baseband circuitry 113 determines an LTE power level for antenna array 111 based on the UE loading. The CPU circuitry directs radio circuitry 112 to drive antenna array 111 at the selected NR power level and at the selected LTE power level. Referring to FIG. 4, radio circuitry 112 drives antenna array 111 at the selected NR power level and at the selected LTE power level. Antenna array 111 wirelessly exchanges NR signals with NR UEs 101 at the selected NR power level. Antenna array 111 wirelessly exchanges LTE signals with LTE UEs 102 at the selected LTE power level.

Referring to FIG. 3, the CPU circuitry in baseband circuitry 113 may determine NR and LTE Multi-User Multiple Input Multiple Output (MU-MIMO) gain and signal strength for UEs 101-102. The CPU circuitry selects an NR beamforming threshold for NR UEs 101 based on the NR MU-MIMO gain. The CPU circuitry then selects some of NR UEs 101 for NR MU-MIMO based on the NR beamforming threshold as compared to individual signal strengths. The CPU circuitry selects an LTE beamforming threshold for LTE UEs 102 based on the LTE MU-MIMO gain. The CPU circuitry then selects some of LTE UEs 102 for LTE MU-MIMO based on the LTE beamforming threshold as compared to individual signal strengths. The CPU circuitry directs radio circuitry 112 to drive antenna array 111 to use NR MU-MIMO for the selected NR UEs 101 and to use LTE MU-MIMO for the selected LTE UEs 102. Referring to FIG. 4, antenna array 111 wirelessly exchanges NR MU-MIMO signals with the selected NR UEs 101 and wirelessly exchanges LTE MU-MIMO signals with the selected LTE UEs 102. In some examples, the use of LTE without beamforming comprises LTE Transmission Mode 3, and the use of LTE with beamforming comprises LTE Transmission Mode 8.

Referring to FIG. 3, the CPU circuitry in baseband circuitry 113 may determine antenna element loss, UE loading, and control channel usage for antenna array 111. In response to the element loss, UE loading, and control channel usage, the CPU circuitry responsively reallocates antenna elements among NR elements 114 and LTE elements 115. The CPU circuitry directs radio circuitry 112 to drive NR elements 114 and LTE elements 115 in antenna array 111 per these allocations and re-allocations. The CPU circuitry may use CPRI to control antenna element allocations through radio circuitry 112. Referring to FIG. 4, radio circuitry 112 drives antenna array 111 per the antenna element allocations to wirelessly exchange NR signals and LTE signals with UEs 101-102.

Figure 5:
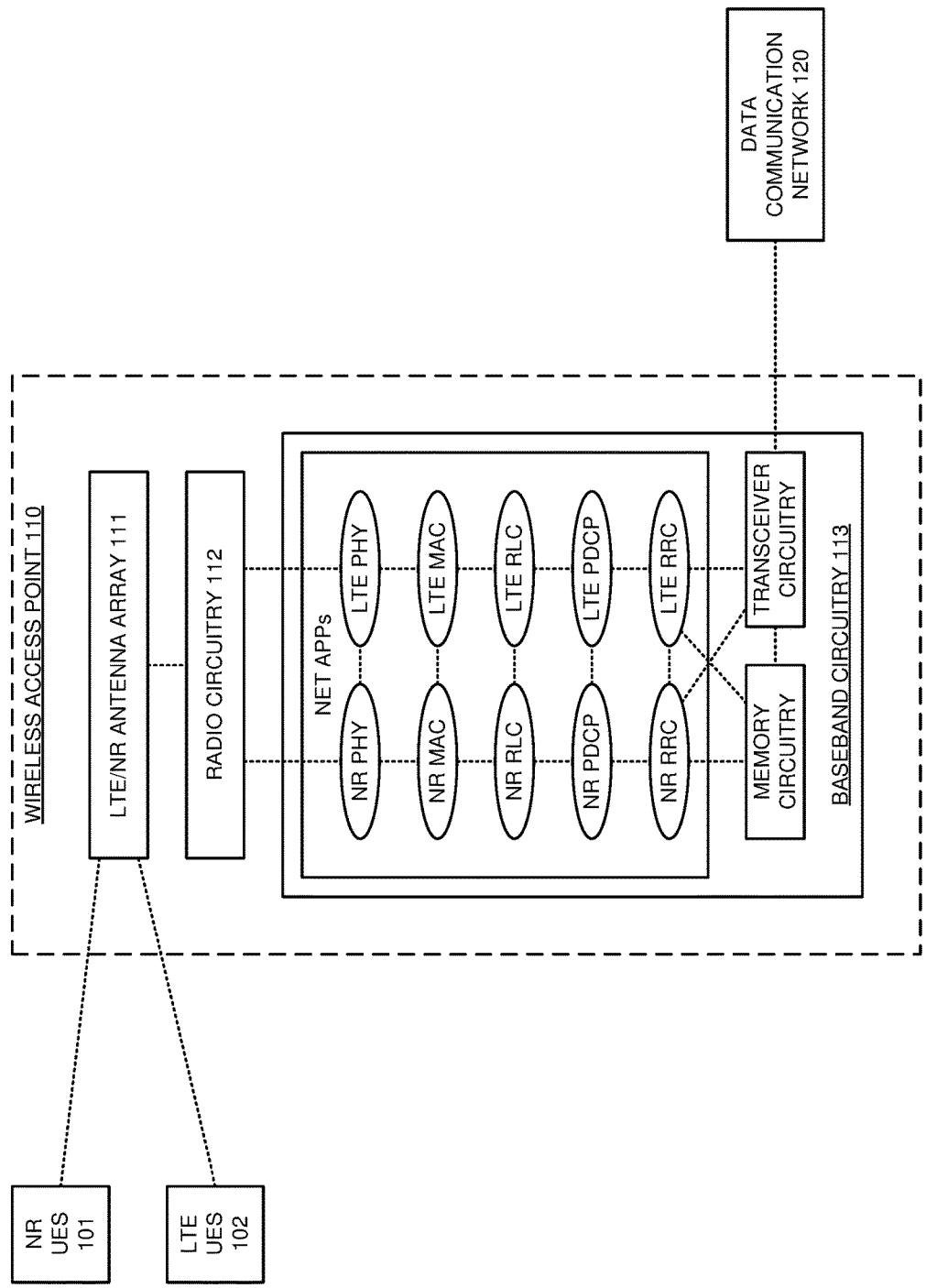
FIG. 5 illustrates a hardware architecture for the wireless base station to control the integrated LTE/NR antenna array.

FIG. 5 illustrates a software architecture for wireless base station 110 to control integrated LTE/NR antenna array 111. Wireless base station 110 comprises LTE/NR antenna array 111, radio circuitry 112, and baseband circuitry 113. Baseband circuitry 113 executes the net apps that comprise NR modules and LTE modules for Physical Layer (PHY), Media Access Control (MAC), Radio Link Control (RLC), Packet Data Convergence Protocol (PDCP), and Radio and Resource Control (RRC). In the net apps of baseband circuitry 113, the NR and LTE PHY exchange data and signaling with UEs 101-102 over radio circuitry 112 and antenna array 111. Thus, the NR PHY controls NR antenna elements 114 in antenna array 111, and the LTE PHY controls the LTE antenna elements 115 in antenna array 111. The NR and LTE PHYs perform functions like inverse fast Fourier transforms/fast Fourier transforms, control insertion/removal, resource element mapping/de-mapping, pre-coding, layer mapping/de-mapping, modulation mapping de-mapping, channel estimation, channel equalization, inverse discrete Fourier transforms, channel coding/decoding, rate matching/de-matching, and scrambling/de-scrambling.

The NR and LTE MACs determine buffer status, power headroom, channel quality, Hybrid Automatic Repeat Request (HARQ) acknowledgements, UE identifiers, and the like. To perform HARQ on the UL, the NR and LTE MACs transfer ACKs for UL data and signaling to UEs 101-102. To perform random access, the NR and LTE MACs process access signaling from UEs 101-102 to initiate scheduling. To perform power control, the NR and LTE MACs component processes channel quality and power headroom to adjust UE power to overcome poor channel quality within headroom and interference limits. The NR and LTE MACs control the power used by NR antenna elements 114 and LTE antenna elements 115 for individual UEs 101-102. The NR and LTE MACs also allocate transmit power among NR antenna elements 114 and LTE antenna elements 115 based on UE loading and historical data. The NR and LTE MACs control communicate with one another to maintain a combined maximum power. To perform scheduling, the NR and LTE MACs process radio channel quality, buffer status, and radio interference to assign data and signaling to wireless payloads. The NR and LTE MACs signal the schedules to UE 101-102. In most cases, the NR and LTE MACs process performance data like data-rate, delay, error-rate, and jitter to maintain Quality-of-Service (QoS) for UE 101-102.

In the net apps, the NR and LTE RLCs map between MAC logical channels and PDUs or RBs. The NR and LTE RLCs perform ARQ for the UL data by transferring UL ACKs to UE 101-102. The NR and LTE RLCs perform ARQ for the DL by retransmitting DL data that was not properly received by UEs 101-102. The NR and LTE PDCPs exchange PDUs with the RLCs. The NR and LTE PDCPs map between the RLC PDUs and Service Data Units (SDUs) for the NR and LTE RRCs. The NR and LTE PDCPs handle security by applying ciphering. The NR and LTE PDCPs perform header compression and decompression. The NR and LTE PDCPs add sequence numbers and re-order received SDUs in their proper sequence. The NR and LTE PDCPs eliminate duplicate UL data.

In the net apps, the NR and LTE RRCs establish and terminate data sessions for UEs 101-102. The NR and LTE RRCs exchange RRC data and signaling with data communication network 120. The NR and LTE RRCs support UE messaging between UE101-102 and data communication network 120. The NR and LTE RRCs direct the broadcast of system information. The NR and LTE RRCs handle security and key management. The NR and LTE RRCs handle handover operations along with UEs 101-102 and data communication network 120. The NR and LTE RRCs manage UE reporting. The NR and LTE RRCs manage UE QoS.

The NR and LTE RRCs may determine NR and LTE MU-MIMO gain and UE signal strength for UEs 101-102. The NR and LTE RRCs may select NR and LTE beamforming thresholds for UEs 101-102 based on the MU-MIMO gains. The NR and LTE RRCs may then select some of UEs 101-102 for MU-MIMO based on the beamforming threshold as compared to individual UE signal strengths. The NR and LTE RRCs direct the NR and LTE MACs to direct (over the PHYs) radio circuitry 112 to drive NR elements 114 and LTE elements 115 in antenna array 111 per these MU-MIMO selections.

The NR and LTE RRCs may determine NR and LTE antenna element loss, NR and LTE UE loading, and NR and LTE control channel usage for antenna array 111. In response to the element loss, UE loading, and control channel usage, the NR and LTE RRCs communicate with one another to responsively reallocate antenna elements among NR elements 114 and LTE elements 115. The NR and LTE RRCs direct the NR and LTE MACs to direct (over the PHYs) radio circuitry 112 to drive NR elements 114 and LTE elements 115 in antenna array 111 per these antenna element allocations.

The computer circuitry described above comprises computer hardware and software that form a special-purpose machine—wireless base station circuitry that controls an integrated NR/LTE antenna array based on several inputs. The computer hardware comprises processing circuitry like CPUs, DSPs, Graphical Processing Units (GPUs), transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuity and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose base station circuitry that controls an integrated NR/LTE antenna array based on several inputs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating wireless base station having an antenna array, the method comprising:
   baseband circuitry determining New Radio (NR) User Equipment (UE) loading on a NR portion of the antenna array and determining Long Term Evolution (LTE) UE loading on an LTE portion of the antenna array;
   the baseband circuitry determining an NR power level for the NR portion of the antenna array based on the NR UE loading and the LTE UE loading and determining an LTE power level for the LTE portion of the antenna array based on the NR UE loading and the LTE UE loading wherein a sum of the NR power level plus the LTE power level is less than or equal to a shared power threshold;
   the baseband circuitry directing radio circuitry to drive the NR portion of the antenna array at the NR power level and directing the radio circuitry to drive the LTE portion of the antenna array at the LTE power level;
   the radio circuitry driving the NR portion of the antenna array at the NR power level and driving the LTE portion of the antenna array at the LTE power level; and
   the NR portion of the antenna array wirelessly exchanging NR signals with NR UEs at the NR power level and the LTE portion of the antenna array wirelessly exchanging LTE signals with LTE UEs at the LTE power level.

2. The method of claim 1 further comprising:
   the baseband circuitry determining NR Multi-User Multiple Input Multiple Output (MU-MIMO) gain for the NR UEs and selecting a NR beamforming signal threshold for the NR UEs based on the NR MU-MIMO gain;
   the baseband circuitry selecting NR MU-MIMO UEs based on the NR beamforming signal threshold and NR signal strength for the NR UEs;
   the baseband circuitry directing radio circuitry to drive the NR portion of the antenna array to use NR MU-MIMO for the selected NR MU-MIMO UEs;

the radio circuitry driving the NR portion of the antenna array to use NR MU-MIMO for the selected NR MU-MIMO UEs; and the NR portion of the antenna array wirelessly exchanging NR MU-MIMO signals with the selected NR MU-MIMO UEs.

3. The method of claim 1 further comprising:

the baseband circuitry determining LTE Multi-User Multiple Input Multiple Output (MU-MIMO) gain for the LTE UEs and selecting an LTE beamforming signal threshold for the LTE UEs based on the LTE MU-MIMO gain;

the baseband circuitry selecting LTE MU-MIMO UEs based on the LTE beamforming signal threshold and LTE signal strength for the LTE UEs;

the baseband circuitry directing radio circuitry to drive the LTE portion of the antenna array to use LTE MU-MIMO for the selected LTE MU-MIMO UEs;

the radio circuitry driving the LTE portion of the antenna array to use LTE MU-MIMO for the selected LTE MU-MIMO UEs; and the LTE portion of the antenna array wirelessly exchanging LTE MU-MIMO signals with the selected LTE MU-MIMO UEs.

4. The method of claim 1 further comprising:

the baseband circuitry detecting an antenna element loss from the antenna array and responsively reducing an amount of antenna elements in the LTE portion of the antenna array;

the baseband circuitry directing the radio circuitry to drive the reduced LTE portion of the antenna array;

the radio circuitry driving the reduced LTE portion of the antenna array; and the reduced LTE portion of the antenna array wirelessly exchanging additional LTE signals with the LTE UEs.

5. The method of claim 1 further comprising:

the baseband circuitry detecting an antenna element loss from the antenna array and responsively reducing an amount of antenna elements in the NR portion of the antenna array;

the baseband circuitry directing the radio circuitry to drive the reduced NR portion of the antenna array;

the radio circuitry driving the reduced NR portion of the antenna array; and the reduced NR portion of the antenna array wirelessly exchanging additional NR signals with the NR UEs.

6. The method of claim 1 further comprising:

the baseband circuitry comparing the LTE UE loading to a loading threshold and reducing an amount of antenna elements in the LTE portion of the antenna array when the LTE UE loading falls under the loading threshold;

the baseband circuitry directing the radio circuitry to drive the reduced LTE portion of the antenna array;

the radio circuitry driving the reduced LTE portion of the antenna array; and the reduced LTE portion of the antenna array wirelessly exchanging additional LTE signals with the LTE UEs.

7. The method of claim 1 further comprising:

the baseband circuitry comparing the NR UE loading to a loading threshold and reducing an amount of antenna elements in the NR portion of the antenna array when the NR UE loading falls under the loading threshold;

the baseband circuitry directing the radio circuitry to drive the reduced NR portion of the antenna array;

the radio circuitry driving the reduced NR portion of the antenna array; and the reduced NR portion of the antenna array wirelessly exchanging additional NR signals with the NR UEs.

8. The method of claim 1 further comprising:

the baseband circuitry determining LTE control channel loading and comparing the LTE control channel loading to a loading threshold;

the baseband circuitry reducing an amount of antenna elements in the LTE portion of the antenna array when the LTE control channel loading falls under the loading threshold;

the baseband circuitry directing the radio circuitry to drive the reduced LTE portion of the antenna array;

the radio circuitry driving the reduced LTE portion of the antenna array; and the reduced LTE portion of the antenna array wirelessly exchanging additional LTE signals with the LTE UEs.

9. The method of claim 1 further comprising:

the baseband circuitry determining NR control channel loading and comparing the NR control channel loading to a loading threshold;

the baseband circuitry reducing an amount of antenna elements in the NR portion of the antenna array when the NR control channel loading falls under the loading threshold;

the baseband circuitry directing the radio circuitry to drive the reduced NR portion of the antenna array;

the radio circuitry driving the reduced NR portion of the antenna array; and the reduced NR portion of the antenna array wirelessly exchanging additional NR signals with the NR UEs.

10. The method of claim 1 wherein the NR portion of the antenna array comprises at least 32 antenna elements and the LTE portion of the antenna array comprises at least 32 antenna elements.

11. A wireless base station to serve New Radio (NR) User Equipment (UEs) and Long Term Evolution (LTE) UEs, the wireless base station comprising:

an antenna array;

baseband circuitry configured to determine NR UE loading on an NR portion of the antenna array and determine LTE UE loading on an LTE portion of the antenna array;

the baseband circuitry configured to determine an NR power level for the NR portion of the antenna array based on the NR UE loading and the LTE UE loading and to determine an LTE power level for the LTE portion of the antenna array based on the NR UE loading and the LTE UE loading wherein a sum of the NR power level plus the LTE power level is less than or equal to a shared power threshold;

the baseband circuitry configured to direct radio circuitry to drive the NR portion of the antenna array at the NR power level and direct the radio circuitry to drive the LTE portion of the antenna array at the LTE power level;

the radio circuitry configured to drive the NR portion of the antenna array at the NR power level and drive the LTE portion of the antenna array at the LTE power level; and the NR portion of the antenna array configured to wirelessly exchange NR signals with NR UEs at the NR power level and the LTE portion of the antenna array configured to wirelessly exchange LTE signals with LTE UEs at the LTE power level.

12. The wireless base station of claim 11 further comprising:

the baseband circuitry configured to determine NR Multi-User Multiple Input Multiple Output (MU-MIMO) gain for the NR UEs and select a NR beamforming signal threshold for the NR UEs based on the NR MU-MIMO gain;

the baseband circuitry configured to select NR MU-MIMO UEs based on the NR beamforming signal threshold and NR signal strength for the NR UEs;

the baseband circuitry configured to direct radio circuitry to drive the NR portion of the antenna array to use NR MU-MIMO for the selected NR MU-MIMO UEs;

the radio circuitry configured to drive the NR portion of the antenna array to use NR MU-MIMO for the selected NR MU-MIMO UEs; and the NR portion of the antenna array configured to wirelessly exchange NR MU-MIMO signals with the selected NR MU-MIMO UEs.

13. The wireless base station of claim 11 further comprising:

the baseband circuitry configured to determine LTE Multi-User Multiple Input Multiple Output (MU-MIMO) gain for the LTE UEs and select an LTE beamforming signal threshold for the LTE UEs based on the LTE MU-MIMO gain;

the baseband circuitry configured to select LTE MU-MIMO UEs based on the LTE beamforming signal threshold and LTE signal strength for the LTE UEs;

the baseband circuitry configured to direct radio circuitry to drive the LTE portion of the antenna array to use LTE MU-MIMO for the selected LTE MU-MIMO UEs;

the radio circuitry configured to drive the LTE portion of the antenna array to use LTE MU-MIMO for the selected LTE MU-MIMO UEs; and the LTE portion of the antenna array configured to wirelessly exchange LTE MU-MIMO signals with the selected LTE MU-MIMO UEs.

14. The wireless base station of claim 11 further comprising:

the baseband circuitry configured to detect an antenna element loss from the antenna array and responsively reduce an amount of antenna elements in the LTE portion of the antenna array;

the baseband circuitry configured to direct the radio circuitry to drive the reduced LTE portion of the antenna array;

the radio circuitry configured to drive the reduced LTE portion of the antenna array; and the reduced LTE portion of the antenna array configured to wirelessly exchange additional LTE signals with the LTE UEs.

15. The wireless base station of claim 11 further comprising:

the baseband circuitry configured to detect an antenna element loss from the antenna array and responsively reduce an amount of antenna elements in the NR portion of the antenna array;

the baseband circuitry configured to direct the radio circuitry to drive the reduced NR portion of the antenna array;

the radio circuitry configured to drive the reduced NR portion of the antenna array; and the reduced NR portion of the antenna array configured to wirelessly exchange additional NR signals with the NR UEs.

16. The wireless base station of claim 11 further comprising:

the baseband circuitry configured to compare the LTE UE loading to a loading threshold and reduce an amount of antenna elements in the LTE portion of the antenna array when the LTE UE loading falls under the loading threshold;

the baseband circuitry configured to direct the radio circuitry to drive the reduced LTE portion of the antenna array;

the radio circuitry configured to drive the reduced LTE portion of the antenna array; and the reduced LTE portion of the antenna array configured to wirelessly exchange additional LTE signals with the LTE UEs.

17. The wireless base station of claim 11 further comprising:

the baseband circuitry configured to compare the NR UE loading to a loading threshold and reduce an amount of antenna elements in the NR portion of the antenna array when the NR UE loading falls under the loading threshold;

the baseband circuitry configured to direct the radio circuitry to drive the reduced NR portion of the antenna array;

the radio circuitry configured to drive the reduced NR portion of the antenna array; and the reduced NR portion of the antenna array configured to wirelessly exchange additional NR signals with the NR UEs.

18. The wireless base station of claim 11 further comprising:

the baseband circuitry configured to determine LTE control channel loading and compare the LTE control channel loading to a loading threshold;

the baseband circuitry configured to reduce an amount of antenna elements in the LTE portion of the antenna array when the LTE control channel loading falls under the loading threshold;

the baseband circuitry configured to direct the radio circuitry to drive the reduced LTE portion of the antenna array;

the radio circuitry configured to drive the reduced LTE portion of the antenna array; and the reduced LTE portion of the antenna array configured to wirelessly exchange additional LTE signals with the LTE UEs.

19. The wireless base station of claim 11 further comprising:

the baseband circuitry configured to determine NR control channel loading and compare the NR control channel loading to a loading threshold;

the baseband circuitry configured to reduce an amount of antenna elements in the NR portion of the antenna array when the NR control channel loading falls under the loading threshold;

the baseband circuitry configured to direct the radio circuitry to drive the reduced NR portion of the antenna array;

the radio circuitry configured to drive the reduced NR portion of the antenna array; and the reduced NR portion of the antenna array configured to wirelessly exchange additional NR signals with the NR UEs.

20. The wireless base station of claim 11 wherein the NR portion of the antenna array comprises at least 32 antenna elements and the LTE portion of the antenna array comprises at least 32 antenna elements.

* * * * *